(12) United States Patent
Lemaire et al.

(10) Patent No.: US 11,878,926 B2
(45) Date of Patent: Jan. 23, 2024

(54) MAINSTREAM DEAMMONIFICATION PROCESS EMPLOYING BYPASS PRIMARY EFFLUENT AND STEP FEEDING

(71) Applicants: Veolia Water Solutions & Technologies Support, Saint-Maurice (FR); Romain Lemaire, Vernou sur Brenne (FR); Hong Zhao, Raleigh, NC (US)

(72) Inventors: Romain Lemaire, Vernon sur Brenne (FR); Hong W. Zhao, Raleigh, NC (US)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 376 days.

(21) Appl. No.: 17/280,215

(22) PCT Filed: Oct. 8, 2019

(86) PCT No.: PCT/US2019/055099
§ 371 (c)(1),
(2) Date: Mar. 26, 2021

(87) PCT Pub. No.: WO2020/076755
PCT Pub. Date: Apr. 16, 2020

(65) Prior Publication Data
US 2021/0355012 A1   Nov. 18, 2021

Related U.S. Application Data

(60) Provisional application No. 62/744,671, filed on Oct. 12, 2018.

(51) Int. Cl.
*C02F 9/00*    (2023.01)
*C02F 3/30*    (2023.01)
(Continued)

(52) U.S. Cl.
CPC ............... *C02F 9/00* (2013.01); *C02F 3/006* (2013.01); *C02F 3/08* (2013.01); *C02F 3/10* (2013.01);
(Continued)

(58) Field of Classification Search
CPC .... C02F 9/00; C02F 3/006; C02F 3/08; C02F 3/10; C02F 3/301; C02F 3/307;
(Continued)

(56) References Cited

U.S. PATENT DOCUMENTS

2014/0238931 A1 * 8/2014 DiMassimo .......... C02F 3/1263
                                                    210/604
2016/0257589 A1    9/2016 Wett et al.
(Continued)

FOREIGN PATENT DOCUMENTS

CN    103011408 A    4/2013
CN    105776539 A    7/2016
(Continued)

*Primary Examiner* — Fred Prince
(74) *Attorney, Agent, or Firm* — COATS & BENNETT, PLLC (57) ABSTRACT

The present invention relates to a mainstream deammonification process for removing ammonium from wastewater that suppresses NOB growth and produces a sludge having good settling characteristics, the process comprising: clarifying the wastewater stream in a primary clarifier (12) and producing a primary effluent; directing a first portion of the primary effluent to a biological treatment reactor (14) and removing carbon to produce treated wastewater; directing treated wastewater into an integrated fixed film activated sludge (IFAS) deammonification reactor (16) integrating nitritation and anammox processes and that is provided with intermittent aeration; directing a second portion of the primary effluent to the IFAS deammonification reactor (16) by-passing the biological treatment reactor (14), and injecting this second portion only during periods of air off and (Continued)

refraining from injecting during periods of air on, directing the IFAS deammonification reactor (16) effluent to a secondary clarifier (18) and producing a secondary effluent and a clarifier underflow, and recycling at least a portion of the underflow to the IFAS deammonification reactor (16).

15 Claims, 3 Drawing Sheets (51) Int. Cl.
*C02F 3/00* (2023.01)
*C02F 3/08* (2023.01)
*C02F 3/10* (2023.01)
*C02F 1/00* (2023.01)
*C02F 101/10* (2006.01)
*C02F 101/16* (2006.01)

(52) U.S. Cl.
CPC .............. *C02F 3/301* (2013.01); *C02F 3/307* (2013.01); *C02F 3/308* (2013.01); *C02F 2001/007* (2013.01); *C02F 2101/105* (2013.01); *C02F 2101/16* (2013.01); *C02F 2203/004* (2013.01); *C02F 2301/043* (2013.01); *C02F 2301/046* (2013.01); *C02F 2301/08* (2013.01); *Y02W 10/10* (2015.05)

(58) Field of Classification Search
CPC ................ C02F 3/308; C02F 2001/007; C02F 2101/105; C02F 2101/16; C02F 2203/004; C02F 2301/043; C02F 2301/046; C02F 2301/08; Y02W 10/10
USPC ........ 210/605, 623, 630, 252, 259, 903, 906
See application file for complete search history.

(56) References Cited

U.S. PATENT DOCUMENTS

| | | | |
|---|---|---|---|
| 2018/0009687 A1 | 1/2018 | Murthy et al. | |
| 2018/0230033 A1* | 8/2018 | Cumbie | ................ C02F 3/2866 |

FOREIGN PATENT DOCUMENTS

| | | | |
|---|---|---|---|
| JP | 2015515370 A | 5/2015 | |
| JP | 2018111061 A | 7/2018 | |
| WO | WO 2012/019310 A1 * | 2/2012 | |
| WO | WO 2015/142586 A2 * | 9/2015 | |
| WO | 2018136350 A1 | 7/2018 | |

* cited by examiner

MAINSTREAM DEAMMONIFICATION PROCESS EMPLOYING BYPASS PRIMARY EFFLUENT AND STEP FEEDING

FIELD OF THE INVENTION

The present invention relates to systems and methods for removing ammonium and more particularly to mainstream deammonification processes.

BACKGROUND OF THE INVENTION

Many wastewaters contain ammonium-nitrogen ($NH_4$—N) (referred to herein as ammonium). To meet various regulatory limits, the ammonium must be removed from the wastewater before the wastewater is discharged. Conventional approach employs a two-step biological process referred to as a nitrification and denitrification process. Conventional nitrification and denitrification processes have a number of drawbacks. First, conventional nitrification and denitrification processes require substantial energy in the form of oxygen generation required during the nitrification phase. Further, denitrification requires carbon and this means that the carbon present in the wastewater should be carefully utilized and this limits the potential for energy recovery from the wastewater (less biogas) and that an external carbon source is often required.

In recent years it has been discovered that ammonium in certain waste stream such as anaerobic sludge digester dewatering liquid (sidestream) can be removed by utilizing different bacteria from those normally associated with conventional nitrification-denitrification. In this case, a typical process combines aerobic nitritation and an anaerobic ammonium oxidation (anammox). In the nitritation step, aerobic oxidizing bacteria (AOB) oxidize a substantial portion of the ammonium in the waste stream to nitrite ($NO_2$). Then in the second step, the anammox bacteria or biomass converts the remaining ammonium and the nitrite to nitrogen gas ($N_2$) and in some cases a small amount of nitrate ($NO_3$). The total process, i.e. nitritation and the anammox anammox process, is referred to as deammonification.

Deammonification process has also been applied to the main line treatment of wastewater treatment plants. Mainstream deammonification processes, however, are difficult to manage and control. In order to effectively remove ammonium in a mainstream deammonification process, the process requires that a number of variables be addressed. For example, the anammox phase of the deammonification process requires the availability of nitrite. If the nitrite concentration is deficient, the anammox bacteria is unable to oxidize the remaining ammonium. A typical problem in a deammonification process relates to controlling nitrite oxidizing bacteria (NOB). Obviously, the presence of significant NOB depletes the nitrite and hence the anammox bacteria do not have nitrite available for the anammox process.

Another concern deals with maintaining a sufficient level of residual ammonium. Residual ammonium is necessary to provide unlimited substrate (ammonium) to the AOB to maintain a higher growth rate of the AOBs than that of the NOBs. With insufficient ammonium present, it is impossible to use sludge wasting (i.e. SRT Control) to out select the NOB but retain the AOB in the mainstream deammonification process.

Another problem that can be experienced in mainstream deammonification processes is that of sludge bulking. In bulking sludge, the mixed liquor suspended solids (MLSS) floc does not compact or settle well, and floc particles are discharged in the secondary clarifier effluent. Sludge bulking can occur in mainstream deammonification processes when the process is conducive to the growth and proliferation of filamentous organisms as opposed to non-filamentous organisms.

Therefore, there is a need for a mainstream deammonification process that addresses sludge bulking, controlling NOB growth, and providing for an adequate concentration of residual ammonium.

SUMMARY OF THE INVENTION

The present invention relates to a mainstream deammonification process for removing ammonium from wastewater that suppresses NOB growth and produces a sludge having good settling characteristics.

In one embodiment, there is provided a mainstream deammonification process that includes an integrated fixed film activated sludge (IFAS) reactor for removing ammonium from a wastewater. The wastewater is subjected to primary clarification which produces a primary effluent. A portion of the primary effluent is directed to a biological treatment reactor for removing carbon from the wastewater. Effluent from the biological treatment unit is directed to the IFAS reactor which, through a deammonification process, removes ammonium from the wastewater. Another portion of the primary effluent bypasses the biological treatment reactor and is directed into the IFAS reactor or to an anaerobic or anoxic selector which selects organisms that give rise to the selection of biomass that has good settling characteristics. The readily biodegradable COD fraction in the primary effluent bypass flow is the substrate that is needed for the selection.

In one embodiment, a deammonification process comprises nitritation and anammox processes which are employed to remove ammonium from the wastewater in the IFAS reactor. By selectively creating anoxic conditions in the IFAS reactor for limited periods of time, a partial denitrification process results which augments the deammonification process by converting nitrate to nitrite.

The present invention, in one embodiment, entails a mainstream deammonification process for removing ammonium from a wastewater stream. The process comprises:
  clarifying the wastewater in a primary clarifier and producing a primary effluent;
  directing a portion of the primary effluent to a biological treatment reactor and removing carbon from the wastewater;
  directing the wastewater from the biological treatment reactor to an IFAS deammonification reactor provided with intermittent aeration including periods of air on and periods of air off;
  in the IFAS deammonification reactor, removing ammonium from the wastewater by a nitritation and anammox process;
  directing the wastewater from the IFAS deammonification reactor to a secondary clarifier and producing a secondary effluent and a clarifier underflow, a portion of which is returned to the IFAS deammonification reactor;
  directing a portion of the primary effluent directly to the IFAS deammonification reactor and in the process bypassing the biological treatment reactor; and
  injecting the primary effluent into the IFAS deammonification reactor during period of off air and reframing from injecting the primary effluent into the IFAS deammonification reactor during periods of air on.

In another embodiment, the present invention entails a mainstream deammonification process for removing ammonium and phosphorus from a stream of wastewater while reducing the tendency of sludge produced in the process to bulk. The process comprises:

clarifying the wastewater stream in a primary clarifier and producing a primary effluent;

directing a first portion of the primary effluent to a biological treatment reactor and removing carbon from the primary effluent to produce treated wastewater;

after treating the first portion of the primary effluent in the biological treatment reactor, directing the treated wastewater into an integrated fixed film activated sludge (IFAS) deammonification reactor that is provided with intermittent aeration, including periods of air on and periods of air off;

directing a second portion of the primary effluent to an anaerobic or anoxic selector located upstream of the IFAS deammonification reactor and in the anaerobic or anoxic selector, selecting biological phosphorus removing microorganisms and non-filamentous microorganisms;

directing an effluent from the anaerobic or anoxic selector into the IFAS deammonification reactor and in the process bypassing the biological treatment reactor;

injecting the effluent from the anaerobic or anoxic selector into the IFAS deammonification reactor wherein the effluent from the anaerobic or anoxic selector is mixed with the treated wastewater in the IFAS deammonification reactor to form a wastewater mixture;

in the IFAS deammonification reactor, removing ammonium from the wastewater mixture by a nitritation and an anammox process and removing phosphorus from the wastewater mixture; and directing the wastewater mixture from the IFAS deammonification reactor to a secondary clarifier and producing a secondary effluent and a clarifier underflow and recycling a portion of the clarifier underflow to the anaerobic or anoxic selector.

In another embodiment, the present invention entails a mainstream deammonification process for removing ammonium from a wastewater stream, comprising clarifying the wastewater stream in a primary clarifier and producing a primary effluent;

directing a first portion of the primary effluent to a biological treatment reactor and removing carbon from the primary effluent to produce treated wastewater;

after treating the first portion of the primary effluent in the biological treatment reactor, directing the treated wastewater to an integrated fixed film activated sludge (IFAS) deammonification reactor provided with intermittent aeration including periods of air on and periods of air off and wherein the IFAS deammonification reactor includes a series of basins;

step feeding the treated wastewater into the basins of the IFAS deammonification reactor;

directing a second portion of the primary effluent to the IFAS deammonification reactor and in the process bypassing the biological treatment reactor;

step feeding the second portion of the primary effluent into the basins of the IFAS deammonification reactor during periods of air on and refraining from step feeding the second portion of the primary effluent into the IFAS deammonification reactor during periods of air on, wherein the second portion of a primary effluent is mixed with the treated wastewater in the IFAS deammonification reactor to form a wastewater mixture;

in the IFAS deammonification reactor, removing ammonium from the wastewater mixture by a nitritation and anammox process; and after removing ammonium from the wastewater mixture, directing the wastewater mixture to a secondary clarifier and producing a secondary effluent and a clarifier underflow, and recycling at least a portion of the underflow to the IFAS deammonification reactor.

DESCRIPTION OF EXEMPLARY EMBODIMENTS

Figure 1:
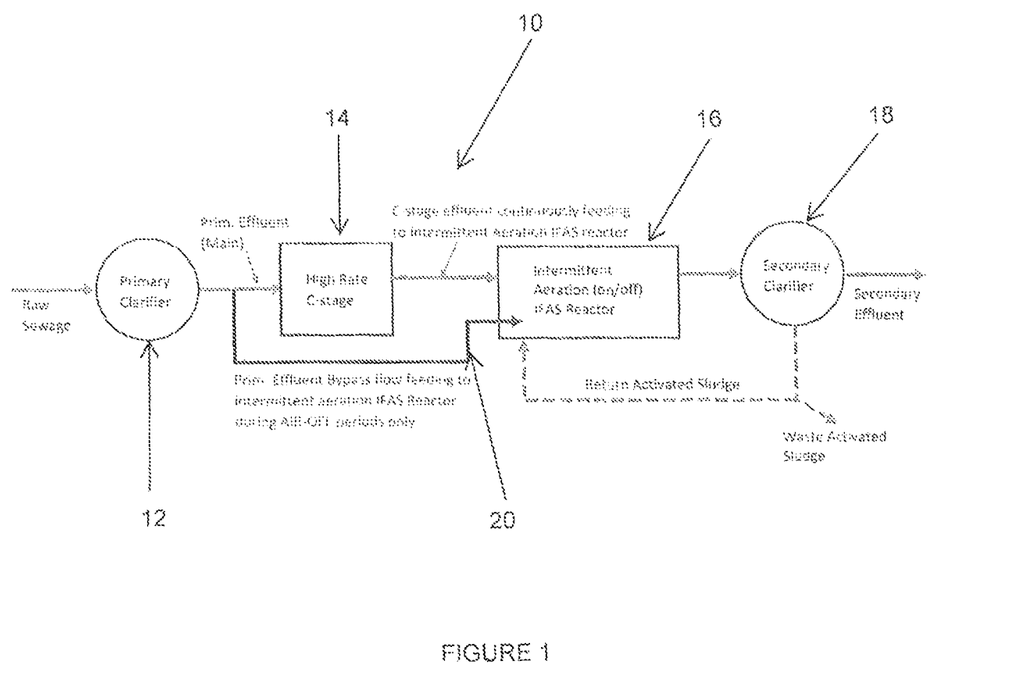
FIG. 1 shows a mainstream deammonification process where primary effluent is directed into an IFAS deammonification reactor.
Figure 2:
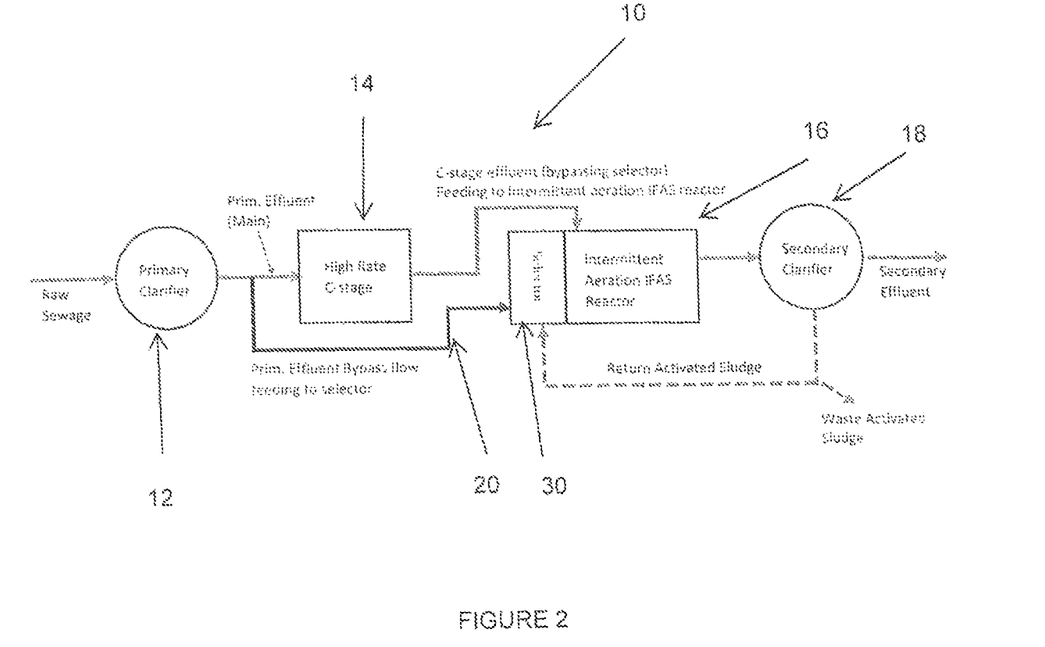
FIG. 2 shows a mainstream deammonification process similar to FIG. 1 but with an anaerobic or anoxic selector upstream of the IFAS reactor.
Figure 3:
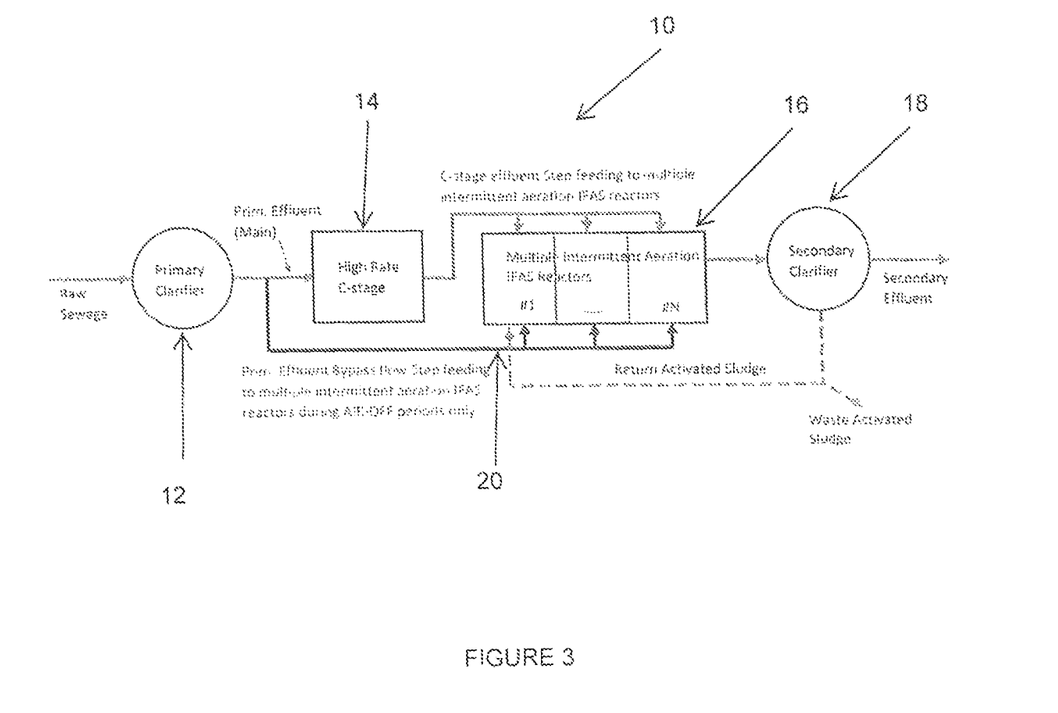
FIG. 3 shows a mainstream deammonification process similar to FIG. 1 but including multiple IFAS deammonification reactors.

FIGS. 1-3 show mainstream deammonification processes. Each process includes one or more IFAS deammonification reactors that remove ammonium from a wastewater stream. Further, each process includes some form of pretreatment. Pretreatment can vary. In the examples shown in FIGS. 1-3, the pretreatment includes a primary clarifier and some means to remove carbon from the wastewater. In the processes shown in FIGS. 1-3, there is provided a high rate biological treatment reactor that is referred to as "high rate C-stage". This reactor reduces the carbon concentrate from the wastewater passing through it. In some processes, carbon is supplied directly to the IFAS reactor by a primary effluent bypass line that circumferents the biological treatment reactor and feeds directly into the IFAS deammonification reactor(s). In some cases, the mainstream deammonification process is provided with an anaerobic or anoxic selector for selecting organisms or biomass that yield good settling sludge.

With reference to FIG. 1, a mainstream deammonification process is shown therein and indicated generally by the numeral 10. This mainstream process includes a primary clarifier 12 that receives raw sewage or wastewater to be treated and clarifies the same to produce primary sludge (not shown) and a primary effluent. Downstream of the primary clarifier 12 is a high rate C-stage reactor 14. The purpose of the high rate C-stage reactor is to remove carbon from the primary effluent. Essentially high rate C-stage reactor is a biological treatment reactor that operates in an aerobic or anaerobic state. Effluent from the high rate C-stage reactor 14 is directed to an IFAS deammonification reactor 16. IFAS reactor 16 is provided with an aeration system. The aeration system is designed to provide "air on periods" and "air off periods". Thus, air is not continuously supplied, but is cycled on and off. During the process of treating wastewater, the dissolved oxygen concentration in the IFAS reactor during an air on period is typically in the range of 0.5 to 2. During the air off periods, conditions in the IFAS reactor 16 are generally anoxic as the dissolved oxygen concentration in the reactor during these periods is typically the range of 0 to 0.5.

Conditions in the IFAS reactor 16 are controlled to give rise to a deammonification process. That is, AOB oxidizes the ammonium in the wastewater to produce nitrite. This is often referred to as nitritation. As a general rule, this will typically convert approximately 50% of the ammonium to nitrite. Thereafter, the process entails an anammox process where anammox bacteria utilizes the nitrite to oxidize the remaining ammonium. In some cases, a small amount of nitrate is produced in this process. The combination of nitritation and the anammox process substantially reduces the concentration of ammonium in the wastewater.

Downstream from the IFAS reactor 16 is a secondary clarifier 18. Effluent from the IFAS reactor 16 is directed to the secondary clarifier 18 which produces a clarifier underflow and a secondary effluent. As shown in FIG. 1, a portion of the underflow produced by the secondary clarifier 18 is recycled as return activated sludge to the IFAS reactor 16. Another portion of the underflow is wasted out from the system and is referred waste activated sludge (WAS).

The system shown in FIG. 1 includes a primary effluent bypass line 20 that is operatively connected at a point upstream of the high rate C-stage reactor 14 and the IFAS reactor 16. Note in FIG. 1 where line 20 bypasses the high rate C-stage reactor 14. The purpose of the primary effluent bypass line 20 is to direct a portion of the carbon-rich primary effluent directly into the IFAS reactor 16. Primary effluent is preferably only injected into the IFAS reactor during air off periods. When the IFAS reactor 16 is operating under aerated conditions, the flow of primary effluent into the reactor is shut off. It has been observed that the process depicted in FIG. 1 tends to improve total nitrogen removal and at the same time produces a sludge having improved settling characteristics. As noted above, the primary effluent in the bypass line 20 is only injected into the IFAS reactor 16 during air off periods. Anoxic conditions are maintained in the IFAS reactor 16 during air off periods. With readily biodegradable carbon being supplied under anoxic conditions, the IFAS reactor periodically becomes an anoxic selector which tends to select and cause the proliferation of non-filamentous organisms. As noted above, these organisms tend to produce a sludge with good settling characteristics.

Also, there is another advantage to feeding primary effluent to the IFAS reactor 16 during air off periods. Doing so improves the anammox process. This is because the supply of readily biodegradable carbon to the IFAS reactor 16 during air off periods gives rise to partial denitrification, that is the conversion of nitrate to nitrite. Converting nitrate to nitrite provides additional nitrite as a substrate for the anammox bacteria. The carbon-to-nitrogen ratio in the primary effluent can vary. Typically in a preferred embodiment, the carbon-to-nitrogen ratio in the primary effluent is approximately 5-8 in terms of total COD to TKN and approximately 2 to 4 in terms of biodegradable soluble COD (bsCOD) to TKN. The goal of bypassing the primary effluent is to maintain the overall C/N ratio in terms of bsCOD to TKN for the combined streams (primary effluent and high rate C-stage effluent) at approximately 0.5 to 2 as gCOD/g-TKN. The process aims to limit the carbon supplied to the IFAS reactor 16 so as to only perform partial denitrification. Expressed in another way, it is advantageous to control the process such that in converting nitrate to nitrite, the nitrite is not further converted to nitrogen gas by the heterotrophic denitrification. This is because of the need to maintain a certain concentration of nitrite in the IFAS reactor 16 to supply the anammox process.

FIG. 2 is another mainstream deammonification process. It is similar to the process of FIG. 1 except that the process of FIG. 1 is not designed to biologically remove phosphorus. However, the FIG. 2 process is designed to biologically remove phosphorus in a mainstream deammonification process.

Viewing FIG. 2, it is seen that the same includes a bio-p selector 30 positioned upstream of the IFAS reactor 16. Furthermore, the primary effluent bypass is directed into the bio-p selector and not into the IFAS reactor 16. Carbon is supplied to the bio-p selector 30 via line 20 and by returning activated sludge from the secondary clarifier 18. By providing a sufficient amount of readily biodegradable carbon to the bio-p selector 30, the selector selects phosphorus accumulating organisms. Note also that the effluent from the high rate C-stage reactor is not directed directly into the bio-p selector 30 but instead bypasses the selector and is directed into the IFAS reactor 16, which will reduce the dilution effect on the bsCOD level in the primary effluent, thus keep higher bsCOD level in the selector. It is contemplated that the process of FIG. 2 can be operated such that the sludge retention time (SRT) required for NOB repression and the SRT required to select phosphorus accumulating organisms (PAOs) are compatible with each other.

Now turning to the FIG. 3 embodiment, it is seen that the system shown in FIG. 3 is similar to FIG. 1. The principle difference lies in the construction of the IFAS reactor 16 and the manner in which the primary effluent and the effluent from the high rate C-stage reactor is fed into the multiple IFAS reactors. Note that the deammonification process is now carried out in a series of intermittent aeration reactors, depicted in FIG. 3 as #1 . . . #n. Consistent with the processes in FIGS. 1 and 2, the aeration in the multiple reactors is intermittent. That is, there are periods of air on and periods of air off.

There are two effluents directed to the multiple IFAS reactors in FIG. 3. The first effluent is the primary effluent that is directed through the bypass line 20 to the multiple IFAS reactors. Note that the primary effluent provides step feeding to the reactors. Again, consistent with the earlier embodiments, the primary effluent is only fed to the IFAS reactors during air off periods. Effluent from the high rate C-stage reactor 14 is continuously fed through a step feeding process to the respective IFAS reactors. Thus, both influents to the multiple IFAS reactors are fed through a step feeding process. There are a number of advantages to step feeding. Step feeding decreases the concentration of mixed liquor suspended solids in the last reactor before the clarifier. This will in turn allow better total suspended solids separation performance in the downstream clarifier for a given sludge settling property.

Deammonification processes depend on not fully exhausting the ammonium in the wastewater being treated. That is, it is preferable to maintain a residual ammonium concentration on the order of 1-5 mg/L in a deammonification reactor. This assures that there is adequate ammonium to support the nitritation process. Otherwise, NOB can proliferate and that results in the oxidation and depletion of the nitrite that is used in the anammox process. Step feeding described above provides an even distribution of ammonium throughout the multiple IFAS reactors and this makes it easier to maintain an adequate residual ammonium concentration in one or more selected reactors.

As discussed before, there is concern that a mainstream annamox process may produce bulking sludge. Mainstream annamox processes described here address the sludge bulking concern. An explanation of why sludge bulking might occur in a mainstream annamox process and how the present processes might address sludge bulking may be helpful.

First, it is preferable in a mainstream annamox process to employ an IFAS system as opposed to a moving bed bioreactor (MBBR) system. Advantages of an IFAS system over an MBBR system, for example, include: (1) an IFAS system is capable of treating higher C/N ratio feed without negatively impacting the annamox bacteria (this is because most heterotrophic organisms exist in suspended growth and annamox bacteria attaches on biofilm); (2) an IFAS process provides additional NOB repression by incorporating sludge retention time (SRT) controls; and (3) IFAS systems achieve lower effluent levels with higher kinetic rates due to less mass transfer resistances.

Sludge bulking can occur in an IFAS mainstream annamox system. Mainstream annamox processes typically treat the effluent from a high rate C-stage reactor. Thus, the effluent being treated typically does not include a large amount of carbon especially the readily biodegradable carbon. Even with very low carbon feed (i.e. low C/N ratio), heterotrophic microorganisms still dominate in the mainstream annamox process compared to autotrophic microorganisms. Because of a lack of carbon, the heterophs can grow on cell decay products (carbon source) from autotrops, including AOB, NOB and annamox bacteria. This leads to an enrichment of filamentous microorganisms, such as chloroflexi, under mainstream conditions. The filamentous growth may enhance biofilm/granules formation but will tend to cause sludge bulking in the suspended growth. This may be considered as typical low food to microorganisms (F/M) ratio bulking. The other reason for sludge bulking is that because of no or low carbon content and a low SRT needed for NOB repression (typically less than 5 days), the MLSS level in the IFAS reactor can be so low that it is difficult to achieve good flocculation.

Preliminary tests indicate that feeding soluble biodegradable COD at a C/N ratio of approximately 0.6 into the IFAS reactor (during intermittent aeration) is capable of repressing the filamentous growth as indicated by the sludge volume index (SVI). This suggests that the fresh bsCOD (biodegradable soluble COD) in the primary effluent is helpful in promoting the growth of floc forming microorganisms by increasing the F/M ratio and increasing the MLSS level in the system.

Preliminary tests, however, even indicate that adding bsCOD at a high C/N ratio of approximately 1 or above into the IFAS reactor can lead to a high SVI. At a C/N ratio of 1-1.4, the F:M ratio based on the MLSS level in the IFAS reactor was not low because the IFAS system was operated at a relatively low SRT that is required for NOB repression. So sludge bulking under the circumstances is not appropriately deemed low FM ratio bulking. It is hypothesized that sludge bulking under these conditions may be caused by providing extra bsCOD into a completely mixed reactor with low dissolved oxygen (DO) during intermittent aeration.

The present process contemplates providing an anaerobic or anoxic selector to improve or contribute to the improvement of sludge settleability by limiting the readily biodegradable COD directed into the initial tank of the IFAS reactor. Preliminary tests suggest that the use of an anaerobic or anoxic selector in front of the initial tank of the IFAS reactor will improve sludge settleability when the overall influent C/N ratio is 1 or above. There is also an additional benefit of such a process. This process will also provide biological phosphorus removal.

Preliminary testing indicates that the C/N ratio of the influent to the IFAS reactor influences the ammonium removal performance of the system and processes discussed herein. Generally, the process performs better when the combined C/N ratio, as defined below, is in the range of 0-2.0 g-bsCOD/g-$NH_4$—N. However, as described above, different combined C/N ratios may have different impacts on the sludge settleability. Also, the impact of the combined C/N ratio on the sludge settleability depends on the process configurations.

In one embodiment, without an anaerobic or anoxic selector, the C/N ratio is preferably in the range of 0.5-1.0. In a process configuration that includes an anaerobic or anoxic selector, the C/N ratio is preferably in the range of 1.0-2.0.

It may be beneficial to examine the concept of a combined C/N ratio and define how it might be calculated.

$$\text{Combined C/N Ratio} = (Q_{PEB} \times \text{bsCOD}_{PEB} + Q_{HRC} \times \text{bsCOD}_{HRC})/(Q_{PEB} \times \text{NH4-N}_{PEB} + Q_{HRC} \times \text{NH4-N}_{HRC})$$

$$Q_{PET} = Q_{PEB} + Q_{HRC}$$

$Q_{PET}$—The total flow of the primary effluent
$Q_{PEB}$—The primary effluent bypass flow
$\text{bsCOD}_{PEB}$—The biodegradable soluble COD (bsCOD) concentration in the primary effluent bypass
$\text{NH4-N}_{PEB}$—The ammonium concentration in the primary effluent bypass
$Q_{HRC}$—The high rate C-stage effluent flow
$\text{bsCOD}_{HRC}$—The bsCOD concentration in the high rate C-stage effluent
$\text{NH4-N}_{HRC}$—The ammonium concentration in the high rate C-stage effluent The biodegradable soluble COD (bsCOD) is used instead of the total COD in the C/N ratio calculations. This is because the bsCOD is an accurate representation of readily biodegradable COD, which has more of an impact on the microorganisms population selection and denitrification process performance than total COD.

The high rate C-stage effluent contains a similar level of ammonium as the primary effluent bypass and does not have much of the bsCOD because the high rate C-stage reactor removes the bsCOD. Thus, most of the bsCOD is in the primary effluent bypass. Therefore, based on this, the combined C/N ratio calculation can be simplified as below:

$$\text{Combined C/N Ratio} = (Q_{PEB} \times \text{bsCOD}_{PEB})/(Q_{PET} \times \text{NH4-N}_{PEB})$$

Thus, it is appreciated that the combined C/N ratio can be controlled by the primary effluent bypass flow ($Q_{PEB}$) because the other parameters ($\text{bsCOD}_{PEB}$, $Q_{PET}$, and $\text{NH4-N}_{PEB}$) are fixed and determined by the sewage coming into the plant.

In terms of providing some level of controls for the combined C/N ratio, at a minimum, the primary effluent bypass flow rate will be determined at the design stage based on the average primary effluent characteristics and the process configurations (with or without the selector) and can be adjusted seasonally based on the seasonal variation in the primary effluent characteristics.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A mainstream deammonification process for removing ammonium from a wastewater stream, comprising:
   clarifying the wastewater stream in a primary clarifier and producing a primary effluent;
   directing a first portion of the primary effluent to a biological treatment reactor and removing carbon from the primary effluent to produce treated wastewater;
   after treating the first portion of the primary effluent in the biological treatment reactor, directing the treated wastewater into an integrated fixed film activated sludge (IFAS) deammonification reactor that is provided with intermittent aeration including periods of air on and periods of air off;
   directing a second portion of the primary effluent to the IFAS deammonification reactor and in the process bypassing the biological treatment reactor;
   injecting the second portion of the primary effluent into the IFAS deammonification reactor during periods of air off and refraining from injecting the second portion of the primary effluent into the IFAS deammonification reactor during periods of air on, wherein the second portion of the primary effluent is mixed with the treated wastewater in the IFAS deammonification reactor to form a wastewater mixture;
   in the IFAS deammonification reactor, removing ammonium from the wastewater mixture by a nitrification and anammox process; and
   after removing ammonium from the wastewater mixture, directing the wastewater mixture to a secondary clarifier and producing a secondary effluent and a clarifier underflow, and recycling at least a portion of the underflow to the IFAS deammonification reactor.

2. The mainstream deammonification process of claim 1 wherein the process produces sludge and the process includes enhancing a settleability of the sludge produced by the process by providing an anaerobic or anoxic selector in the mainstream deammonification process upstream of the IFAS deammonification reactor and employing the anaerobic or anoxic selector to select non-filamentous biomass.

3. The mainstream deammonification process of claim 1 wherein the IFAS deammonification reactor is a plug flow reactor and includes a series of basins; and wherein the process includes step feeding the treated wastewater and the second portion of the primary effluent to the basins.

4. The mainstream deammonification process of claim 1 including maintaining the residual ammonia concentration in the IFAS deammonification reactor at greater than 1 mg/L.

5. The process of claim 1 wherein, in addition to removing ammonium in the IFAS deammonification reactor through nitrification and anammox, the process further includes partially denitrifying ammonium in the IFAS deammonification reactor by converting at least some nitrate to nitrite.

6. The process of claim 1 further including maintaining aerobic conditions in the IFAS deammonification reactor during periods of air on and maintaining anoxic conditions in the IFAS deammonification reactor during periods of air off.

7. The method of claim 6 wherein, during periods of air on in the IFAS deammonification reactor, a dissolved oxygen concentration is maintained at 0.5-2 mg/L and during periods of air off, maintaining the dissolved oxygen concentration in the IFAS demmonification reactor in the range of 0-0.5 mg/L.

8. The process of claim 1 wherein the IFAS deammonification reactor partially denitrifies the wastewater mixture therein by converting at least some nitrate to nitrite.

9. The process of claim 1 wherein the process is controlled to provide partial denitrification in the IFAS deammonification reactor by maintaining the biodegradable soluble chemical oxygen demand (bsCOD) to TKN at approximately 0.5-2 as gCOD/g-TKN.

10. A mainstream deammonification process for removing ammonium and phosphorus from a stream of wastewater while reducing a tendency of sludge produced in the process to bulk, the process comprising:
    clarifying the wastewater stream in a primary clarifier and producing a primary effluent;
    directing a first portion of the primary effluent to a biological treatment reactor and removing carbon from the primary effluent to produce treated wastewater;
    after treating the first portion of the primary effluent in the biological treatment reactor, directing the treated wastewater into an integrated fixed film activated sludge (IFAS) deammonification reactor that is provided with intermittent aeration, including periods of air on and periods of air off;
    directing a second portion of the primary effluent to an anaerobic or anoxic selector located upstream of the IFAS deammonification reactor and in the anaerobic or anoxic selector, selecting biological phosphorus removing microorganisms and non-filamentous microorganisms;
    directing an effluent from the anaerobic or anoxic selector into the IFAS deammonification reactor and in the process bypassing the biological treatment reactor;
    injecting the effluent from the anaerobic or anoxic selector into the IFAS deammonification reactor wherein the effluent from the anaerobic or anoxic selector is mixed with the treated wastewater in the IFAS deammonification reactor to form a wastewater mixture;
    in the IFAS deammonification reactor, removing ammonium from the wastewater mixture by a nitrification and an anammox process and removing phosphorus from the wastewater mixture; and
    directing the wastewater mixture from the IFAS deammonification reactor to a secondary clarifier and producing a secondary effluent and a clarifier underflow and recycling a portion of the clarifier underflow to the anaerobic or anoxic selector.

11. The process of claim 10 wherein a carbon is supplied to the anaerobic or anoxic selector via the second portion of the primary effluent and return activated sludge from the secondary clarifier.

12. The process of claim 10 wherein the treated wastewater that is treated in the biological treatment reactor is not directed into the anaerobic or anoxic selector but instead bypasses the anaerobic or anoxic selector and is directed into the IFAS deammonification reactor.

13. A mainstream deammonification process for removing ammonium from a wastewater stream, comprising:
    clarifying the wastewater stream in a primary clarifier and producing a primary effluent;
    directing a first portion of the primary effluent to a biological treatment reactor and removing carbon from the primary effluent to produce treated wastewater;
    after treating the first portion of the primary effluent in the biological treatment reactor, directing the treated wastewater to an integrated fixed film activated sludge (IFAS) deammonification reactor provided with intermittent aeration including periods of air on and periods of air off and wherein the IFAS deammonification reactor includes a series of basins;

step feeding the treated wastewater into the basins of the IFAS deammonification reactor;

directing a second portion of the primary effluent to the IFAS deammonification reactor and in the process bypassing the biological treatment reactor;

step feeding the second portion of the primary effluent into the basins of the IFAS deammonification reactor during periods of air on and refraining from step feeding the second portion of the primary effluent into the IFAS deammonification reactor during periods of air on, wherein the second portion of a primary effluent is mixed with the treated wastewater in the IFAS deammonification reactor to form a wastewater mixture;

in the IFAS deammonification reactor, removing ammonium from the wastewater mixture by a nitritation and anammox process; and after removing ammonium from the wastewater mixture, directing the wastewater mixture to a secondary clarifier and producing a secondary effluent and a clarifier underflow, and recycling at least a portion of the underflow to the IFAS deammonification reactor.

14. The process of claim 13 wherein each of the basins of the IFAS deammonification reactor includes intermittent aeration.

15. The process of claim 13 including maintaining a residual ammonium concentration in the IFAS deammonification reactor on the order of 1-5 mg/L.

* * * * *